United States Patent Office 3,414,009
Patented Dec. 3, 1968

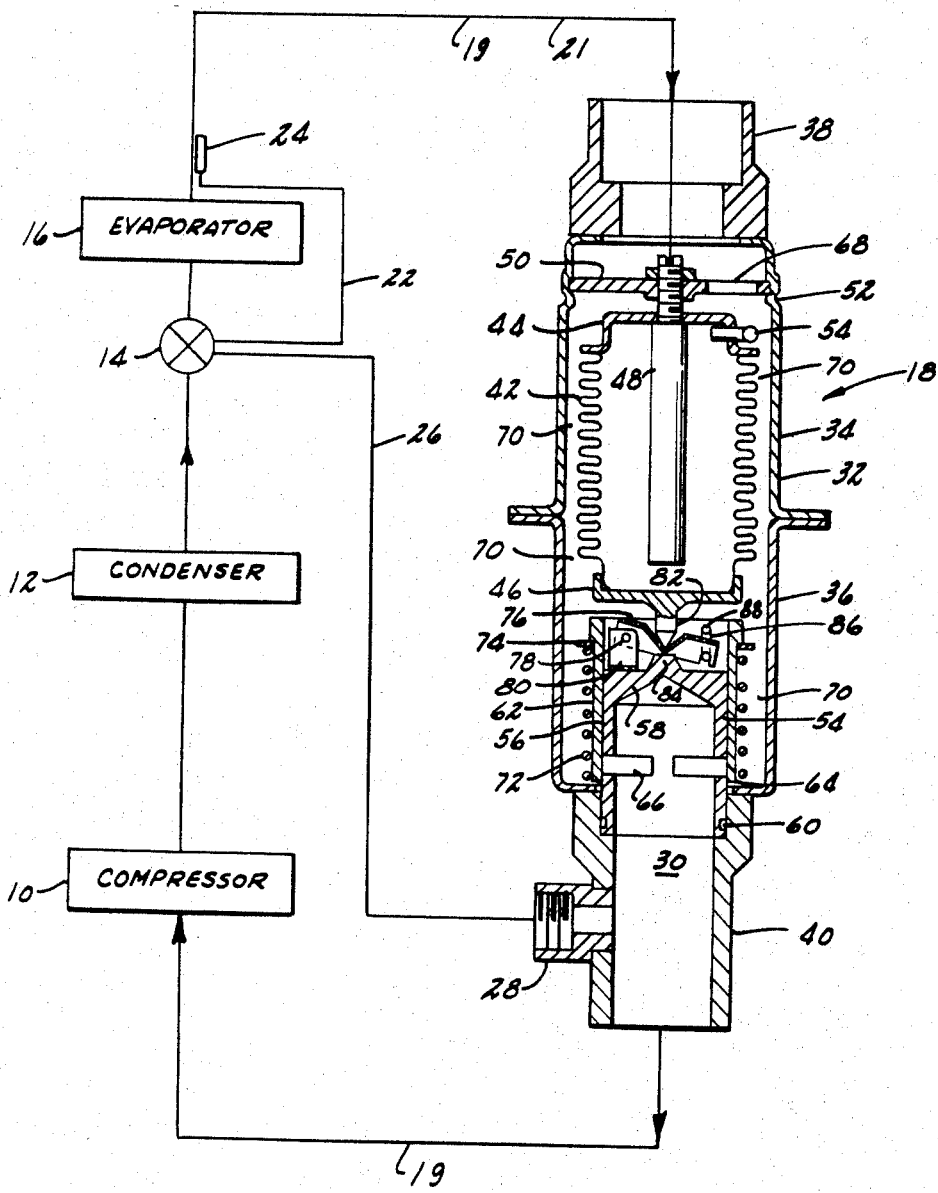

3,414,009
INLET PRESSURE REGULATOR
Leo F. Merchant, Southfield, Mich., assignor to American Standard Inc., a corporation of Delaware
Filed Apr. 8, 1966, Ser. No. 541,335
10 Claims. (Cl. 137—494)

This invention relates to a gas pressure regulator comprising an expansible bellows located in the inlet chamber of the regulator to respond to variations in supply gas pressure, whereby to move a valve element across a flow part to thus provide a regulated pressure in said inlet chamber.

The invention is particularly applicable to refrigerating systems for regulating the pressure of gaseous refrigerant discharged from the refrigerant evaporator. In such systems it is desirable that the pressure at the evaporator outlet be closely regulated to prevent undesirably low evaporator coil temperatures.

One object of the invention is to provide a gas pressure regulator comprising a pressure-responsive bellows power element in the inlet chamber of the regulator, together with a motion-multiplying connection between the bellows and valve element, to thus increase the sensitivity of response of the bellows to supply pressure variations.

An additional object of the invention is to provide a gas pressure regulator having a balanced valve element of the slideable sleeve type, whereby the regulating action is devoid of imbalances due to the area of the valve element.

A further object of the invention is to provide a gas pressure regulator which is direct acting as opposed to the pilot-operated type, the general purpose being to simplify the design and lower the cost.

Another object is to provide a gas pressure regulator having a motion-multiplying connection between the bellows power element and valve element, said connection being especially designed to be free of frictional forces which would add hysteresis and loss of sensitivity in the regulator.

Another object is to provide a pressure regulator in which the motion-multiplying connection includes a lever contained within the outline of the valve element, whereby the lever applies force to the element near its axis, thus minimizing undesired moment arms tending to impede the valve element movement.

In the drawing:
The single figure is a sectional view taken through a pressure regulator of the invention, and showing said regulator in a conventional refrigeration system.

Referring in greater detail to the drawing, there is shown a refrigeration system comprising a refrigerant compressor 10, refrigerant condenser 12, expansion valve 14, evaporator 16 and evaporator pressure regulator 18 disposed in a suction line 19. Illustrated expansion valve 14 is provided with a capillary 22 and refrigerant-charged temperature sensing bulb 24 which responds to the outlet temperature to control the valve element in the expansion valve in the conventional manner. An additional pressure equalizer line 26 extends from the underside of the expansion valve diaphragm (not shown) to a fitting 28 communicating with the outlet chamber 30 of the evaporator pressure regulator 18.

The present invention is concerned particularly with the construction of evaporator pressure regulator 18. As shown in the illustrative drawing, the regulator comprises a housing 32 which includes two flanged tubular casing elements 34 and 36, and two threaded fittings 38 and 40, said casing elements and fittings being suitably bonded together, as by welding, to provide a unitary housing structure. Positioned within the housing structure is a metallic bellows 42 having an upper fixed end wall 44 and a lower movable end wall 46. The upper end wall is suitably affixed and sealed to a post 48 which adjustably threads into a plate 50 suitably held in the housing structure by circumferentially spaced dimples 52. The lower end of post 48 constitutes a stop for engagement with movable end wall 46 to limit contractive movement of the bellows.

Prior to installation bellows 42 may be charged through charging tube 54 with gas or vapor to a pressure approximating the regulated pressure to be obtained in portion 21 of the suction line 19. As an alternative, bellows 42 may be evacuated and a compression spring (not shown) of suitable load and rate placed within the bellows to develop the control force necessary to achieve the desired external pressure. The bellows charge or internal spring constitutes a calibrated force means which controls the bellows movement. The bellows movement is in turn translated to a sleeve type valve element 62 controlling gas flow from inlet chamber 70 to outlet chamber 30. Thus, pressure increase in chamber 70 contracts the bellows which opens valve element 62, thus relieving the excess pressure and restoring the proper pressure condition in line 21. Pressure decrease in chamber 70 below a desired value allows the calibrated force means within the bellows to expand the bellows, thus partially or fully closing valve element 62 and trapping pressure in chamber 70 until the pressure slightly overruns the desired value. The valve is a modulated valve which moves to various partially open positions in accordance with control demands imposed on the bellows.

The illustrated regulator includes a cup-shaped subhousing 54 of cylindrical cross section, said subhousing including a tubular side wall 56 and a closed end wall 58. As shown in the drawing, the subhousing may be fixedly telescoped into a counterbore in fitting 40 and sealed thereto by an O-ring 60 to preclude gas leakage at the cup-fitting joint. Slideably telescoped over the tubular subhousing 54 is a sleeve-like valve element 62 having a lower edge 64 arranged to move across the flow ports 66 formed in subhousing 54. In its illustrated position sleeve 62 has been moved by expansion of bellows to the limit of its downward movement; upward movement of sleeve 62 opens the flow ports 66 and permits gaseous refrigerant to flow from fitting 38 through aperture 68, into inlet chamber 70, thence through ports 66 to outlet chamber 30. Upward movement of the sleeve is effected by a light coil spring 72 having its upper end convolution engaged with a shoulder-forming washer or disc 74 which seats against a flange on sleeve 62. Spring 72 is a relatively light spring having a load rating sufficient to move sleeve 62 upwardly against frictional resistance but insufficient to effect any appreciable contraction of bellows 42.

The bellows is connected to sleeve 62 by a motion-multiplying connection constructed as a channel-cross sectioned lever 76. The flanges on the lever are connected by a pin 78 which runs through an upstanding U-shaped bracket 80 suitably affixed to the end wall 58 of subhousing 54. Pin 78 thus constitutes a fulcrum for the lever. As shown, the end wall 46 of the bellows is provided with a conical force-applying portion 82 which engages a conical depression in the web wall of channel 76 to thus pivot the lever downwardly about fulcrum 78 to its illustrated position. In its illustrated position the lever is engaged with an upstanding stop 84 formed integrally with end wall 58, said stop not only limiting the lever movement, but also limiting the expansion movement of bellows 42, thus preventing the bellows from overtravel movement such as might bend the lever and destroy the calibration.

The right end portions of the lever flanges are notched along their lower edges to receive the central portion of a wire type link 86, said link being generally U-shaped but having outturned upper ends 88 pivotally disposed in small circular openings in sleeve 62. Thus the link can swing in a small arc about the horizontal axis defined by end portions 88 as lever 76 pivots in a vertical plane about fulcrum 78. Link 86 constitutes a substantially frictionless connection between lever 76 and sleeve 62.

During service, bellows 42 assumes its expanded illustrated position when the pressure in chamber 70 falls appreciably below the desired pressure in portion 21 of the suction line. In this position sleeve element 62 closes ports 66, thus fully trapping pressure in chamber 70, causing a buildup in the chamber 70 pressure which tends to contract bellows 42. As the bellows contracts the spring 72 is enabled to bias the sleeve 62 upwardly to expose the flow ports 66 to the inlet chamber pressure. The pressure is thus exhausted from chamber 70 to provide a pressure closely approximating the desired regulator pressure. Under most circumstances valve 62 would move between various partially open positions without actually coming to the fully closed or fully open position.

It will be noted that valve element 62 is of the balanced sleeve type wherein the opposite ends of the element are exposed to the same pressure. The valve is thus substantially balanced and is free of the unbalanced force which exists across a conventional poppet valve element when in a closed position. By thus using a balanced valve it is possible to make the system more responsive to pressure variations and to minimize hysteresis and loss of sensitivity.

A further feature contributing to improved sensitivity is the illustrated use of a motion-multiplying lever between the bellows power element and valve element. With the illustrated motion amplification (2 to 1 in the illustration) each incremental movement of the bellows results in a fairly large movement of the valve element and a correspondingly increased effect on the inlet chamber pressure. The motion-multiplier is also advantageous in reducing the length and number of convolutions of the bellows while still using a satisfactory bellows spring rate. The bellows can thus have a fairly low rate in pounds per inch deflection, to thus respond quickly to inlet chamber pressure variation.

It will be noted that motion-multiplying lever 76 has its connection points 88 with sleeve 62 fairly close to the sleeve axis. The lever therefore does not exert any substantial moment arm tending to cause the sleeve to bind on the tubular structure 54. At the same time the lever and the sleeve are contained within the outline of the bellows 42, thus enabling the components to be contained within a relatively small low cost housing structure 32 of tubular configuration.

Various minor changes in design, in structure and detail may of course be resorted to while practicing the invention as defined in the appended claims.

I claim:
1. A gas pressure regulator comprising a housing structure having internal wall means equipped with a flow port therein, said wall means subdividing the housing structure into an inlet chamber for gas whose pressure is to be regulated and an outlet chamber for exhaust gas; a sealed bellows disposed within the inlet chamber; said bellows having calibrated internal force means whereby inlet chamber pressures above the regulated pressure effect contraction of the bellows, and inlet chamber pressures below the regulater pressure permit expansion of the bellows by the calibrated force means; a valve element arranged to traverse the defined flow port; a motion-multiplying means connecting the valve element with the bellows whereby expansion of the bellows effects a magnified closing movement of the valve element; and spring means acting on the valve element to move same in the port-opening direction, said spring means developing sufficient force on the valve element to effect movement thereof but insufficient force to effect any appreciable contraction of the bellows, whereby the position of the valve element is determined substantially solely by pressure differential between the inlet chamber and bellows interior.

2. The pressure regulator of claim 1 wherein the flow port walls means comprises a tubular wall structure having its outer surface exposed to the inlet chamber and its inner surface exposed to the outlet chamber; said valve element comprising a sleeve slideably telescoped over the outer surface of said tubular wall structure.

3. The pressure regulator of claim 2 wherein the spring means comprises a coil spring surrounding the valve element sleeve, said sleeve having a shoulder engaging an end convolution of the spring to operatively connect said sleeve and spring.

4. The pressure regulator of claim 3 wherein the tubular wall structure is provided with a closed end wall; the aforementioned connecting means between the bellows and valve element comprising a lever having one end thereof fulcrummed on the closed end wall, an intermediate portion thereof operatively engaged with the bellows, and the other end thereof operatively engaged with the valve element sleeve.

5. The pressure regulator of claim 4 wherein the valve element sleeve includes wall portions extending beyond the tubular wall structure in the direction of the bellows, said lever being connected to said sleeve by a wire link, said link having aligned end portions pivotally mounted in the extension wall portion of the sleeve and an intermediate portion engaged with the aforementioned lever.

6. The pressure regulator of claim 5 wherein the expansion movement of the bellows is limited by a stop carried by the end wall of the tubular wall structure; said stop being located in alignment with the intermediate portion of the lever to thus cause the lever to be squeezed between the stop and bellows, whereby to prevent bending of the lever.

7. The pressure regulator of claim 1 wherein the aforementioned connecting means comprises a lever arranged to translate bellows movement into magnified valve element movement.

8. The pressure regulator of claim 7 wherein the bellows and valve element are in axial alignment with one another, said lever being arranged within the peripheral outline of the valve element and bellows; the aforementioned housing structure including a tubular casing coaxial with the axis defined by the bellows and valve element, said casing having inlet and outlet fittings extending axially from its opposite ends, whereby gas flows through one fitting into the inlet chamber, thence axially past the outer surfaces of the bellows and valve element, thence through the defined flow port, and thence into the outlet chamber and other fitting.

9. The pressure regulator of claim 8 wherein the outlet chamber is defined by a cup-shaped subhousing having a closed end wall and a peripheral side wall terminating in an open mouth, said cup-shaped subhousing having its mouth forming portion fixedly telescoped into said other fitting; the valve element comprising a sleeve element slideably telescoped over the outer surface of the subhousing side wall for axial movement therealong.

10. The pressure regulator of claim 1 wherein the calibrated force means consist of a gas charged into the bellows at approximately the pressure setting of the regulator.

References Cited
UNITED STATES PATENTS
3,232,310   2/1966   Treder _____ 137—494 XR WILLIAM F. O'DEA, *Primary Examiner.*

H. W. WEAKLEY, *Assistant Examiner.*